United States Patent
Gao et al.

(10) Patent No.: US 11,855,733 B2
(45) Date of Patent: *Dec. 26, 2023

(54) METHOD AND APPARATUS FOR ADJUSTING HALF-POWER ANGLE OF ANTENNA

(71) Applicant: HUAWEI TECHNOLOGIES CO., LTD., Shenzhen (CN)

(72) Inventors: Quanzhong Gao, Shanghai (CN); Hui Gao, Shanghai (CN); Hongjie Hu, Shanghai (CN); Fengyong Qian, Shanghai (CN); Chengzhi Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,528

(22) Filed: Nov. 18, 2022

(65) Prior Publication Data

US 2023/0088956 A1     Mar. 23, 2023

Related U.S. Application Data

(63) Continuation of application No. 17/196,703, filed on Mar. 9, 2021, now Pat. No. 11,509,377, which is a
(Continued)

(30) Foreign Application Priority Data

Sep. 10, 2018   (CN) .......................... 201811052698.6
Aug. 26, 2019   (CN) .......................... 201910790355.8

(51) Int. Cl.
    *H04B 7/06*     (2006.01)

(52) U.S. Cl.
    CPC ......... *H04B 7/0693* (2013.01); *H04B 7/0617* (2013.01)

(58) Field of Classification Search
    CPC .. H04B 7/0693; H04B 7/0617; H04B 7/0874; H01Q 3/24; H01Q 1/246; H01Q 3/22; H04W 16/28
    See application file for complete search history.

(56) References Cited

U.S. PATENT DOCUMENTS 10,050,752 B1 *   8/2018  Bales ..................... H01Q 3/242
11,509,337 B2 *  11/2022  Sanderovich ........ H04B 1/1027
(Continued)

FOREIGN PATENT DOCUMENTS

CN     1688170 A    10/2005
CN     1909400 A     2/2007
(Continued)

OTHER PUBLICATIONS

Lu et al., "Theory and Practice of Mobile Communication," Xidian University Press, Total 7 pages (Feb. 2017). With English Abstract.
(Continued)

*Primary Examiner* — Sung S Ahn
(74) *Attorney, Agent, or Firm* — Leydig, Voit & Mayer, Ltd.

(57) ABSTRACT

This application provides a method for adjusting a half-power angle of an antenna, to adjust a maximum half-power angle or a maximum beam gain of an individual transceiver channel. The method includes: first determining that M antenna elements in N antenna elements connected to a first transceiver channel of an access network device need to be turned on or off, where N>M≥1, and both N and M are integers, that is, a quantity of antenna elements driven by the first transceiver channel needs to be adjusted; and then sending first indication information to the access network
(Continued)

device, where the first indication information is used to indicate to turn on or off the M antenna elements.

16 Claims, 7 Drawing Sheets

Related U.S. Application Data continuation of application No. PCT/CN2019/115241, filed on Nov. 4, 2019.

(56) References Cited

U.S. PATENT DOCUMENTS

| | | |
|---|---|---|
| 2003/0022694 A1 | 1/2003 | Olsen et al. |
| 2008/0095251 A1 | 4/2008 | Yeh et al. |
| 2015/0222331 A1* | 8/2015 | Zhang .................. H04B 7/0874 375/267 |
| 2016/0255605 A1 | 9/2016 | Kyeong et al. |
| 2016/0352002 A1 | 12/2016 | Aue |
| 2016/0380353 A1 | 12/2016 | Lysejko et al. |

FOREIGN PATENT DOCUMENTS

| | | |
|---|---|---|
| CN | 101056451 A | 10/2007 |
| CN | 101335553 A | 12/2008 |
| CN | 103581965 A | 2/2014 |
| CN | 103812547 A | 5/2014 |
| CN | 104319483 A | 1/2015 |
| CN | 104754716 A | 7/2015 |
| CN | 105580466 A | 5/2016 |
| CN | 106207497 A | 12/2016 |
| CN | 107229763 A | 10/2017 |
| CN | 108092700 A | 5/2018 |
| CN | 207339827 U | 5/2018 |
| EP | 2506625 A1 | 10/2012 |
| JP | H102948 A | 1/1998 |
| JP | 2002064427 A | 2/2002 |
| JP | 2006527514 A | 11/2006 |
| KR | 20190012092 A | 2/2019 |
| WO | 2015120417 A2 | 8/2015 |
| WO | 2016029485 A1 | 3/2016 |
| WO | 2016065644 A1 | 5/2016 |
| WO | 2017187473 A1 | 11/2017 |

OTHER PUBLICATIONS

Sun et al., "Mobile Communications Networks and Technologies 2nd Edition," Xidian University Publishing House, Total 4 pages (Feb. 2018). With English Abstract.
Zhu Junjie, "Research of Pattern and Beam Optimal Coverage for Base Station Antenna," total 75 pages (May 15, 2013). With English abstract.
U.S. Appl. No. 17/196,703, filed Mar. 9, 2021.

\* cited by examiner

METHOD AND APPARATUS FOR ADJUSTING HALF-POWER ANGLE OF ANTENNA

CROSS-REFERENCE TO RELATED APPLICATIONS

This application is a continuation of U.S. patent application Ser. No. 17/196,703, filed on Mar. 9, 2021, now U.S. Pat. No. 11,509,377, which is a continuation of International Application No. PCT/CN2019/115241, filed on Nov. 4, 2019, which claims priority to Chinese Patent Application No. 201910790355.8, filed on Aug. 26, 2019 and Chinese Patent Application No. 201811052698.6, filed on Sep. 10, 2018. All of the afore-mentioned patent applications are hereby incorporated by reference in their entireties.

TECHNICAL FIELD

This application relates to the field of communications, and more specifically, to a method and an apparatus for adjusting a half-power angle of an antenna.

BACKGROUND

A beam is generally defined as selectivity to different directions in space, and can be directed to different directions in space through beamforming. In brief, if a plurality of antenna elements connected to a transceiver channel form a uniformly distributed linear array, and there are two or more such transceiver channels that each are also in linear arrangement, beamforming can be performed by adjusting phases of the transceiver channels, to direct beams to different directions in space. A range of directions to which a beam can be directed is usually defined by a half-power angle. The half-power angle includes a vertical half-power angle and a horizontal half-power angle. The vertical half-power angle defines a beam width in a vertical plane, and the horizontal half-power angle defines a beam width in a horizontal plane. Usually, the range of directions to which the beam can be directed is determined by a beam formed by an antenna element driven by an individual transceiver channel. In other words, a range of a half-power angle (a vertical half-power angle or a horizontal half-power angle) of an antenna array does not exceed that of a half-power angle formed by the antenna element driven by the individual transceiver channel. In addition, for a specific antenna array, a maximum beam gain that can be reached is constant when transmit power is constant. It can be learned from the above that for a specific antenna array, when transmit power is constant, a maximum half-power angle and a maximum beam gain of the antenna array are constant. Moreover, when a half-power angle of the antenna array is the largest, a beam gain is the smallest.

In practical applications, increasing the maximum half-power angle of the antenna array needs to be considered in some cases, and increasing the maximum beam gain of the antenna array needs to be considered in some other cases. However, in current technologies, for a specific antenna array, increasing a maximum half-power angle of an antenna array and increasing a maximum beam gain of the antenna array cannot be flexibly switched.

SUMMARY

This application provides a method for adjusting a half-power angle of an antenna, to adjust a maximum half-power angle or a maximum beam gain of an individual transceiver channel.

According to first aspect, a method for adjusting a half-power angle of an antenna is provided, including: determining that M antenna elements in N antenna elements connected to a first transceiver channel of an access network device need to be turned on or off, where N>M≥1, and both N and M are integers; and sending first indication information to the access network device, where the first indication information is used to indicate to turn on or off the M antenna elements.

It should be understood that the first transceiver channel may be any transceiver channel of the access network device or a specific transceiver channel of the access network device.

A beam is generally defined as selectivity to different directions in space. A range of directions to which the beam can be directed is usually defined by a half-power angle. In a power pattern, in a plane containing a maximum radiation direction of a main lobe, an included angle between two points at which power flux density drops to half of the power flux density in the maximum radiation direction (or 3 dB less than a maximum value) is referred to as a half-power angle. The half-power angle includes a vertical half-power angle and a horizontal half-power angle. The vertical half-power angle defines a beam width in a vertical plane, and the horizontal half-power angle defines a beam width in a horizontal plane.

The range of directions to which the beam can be directed depends on hardware.

When a quantity of antenna elements driven by an individual transceiver channel is constant, a half-power angle formed by the antenna elements driven by the individual transceiver channel (referred to as the half-power angle of the individual transceiver channel for short in this specification) is fixed. Moreover, as the quantity of elements driven by the individual transceiver channel increases, a maximum beam gain increases, and a maximum half-power angle decreases; as the quantity of elements driven by the individual transceiver channel decreases, a maximum beam gain decreases, and a maximum half-power angle increases. Generally, a range of a half-power angle of an antenna array does not exceed that of a half-power angle of an individual transceiver channel. In addition, for an antenna array with a fixed transceiver channel, if transmit power is constant, as a quantity of antenna elements driven by an individual transceiver channel increases, a maximum half-power angle of the antenna array decreases, and a maximum beam gain of the antenna array increases; conversely, as a quantity of antenna elements driven by an individual transceiver channel decreases, a maximum half-power angle of the antenna array increases, and a maximum beam gain of the antenna array decreases.

Therefore, in this application, the maximum half-power angle or the maximum beam gain of the individual transceiver channel can be adjusted by adjusting the quantity of antenna elements driven by the individual transceiver channel, to adjust the maximum half-power angle or the maximum beam gain of the antenna array.

With reference to the first aspect, in a possible implementation of the first aspect, the method further includes: receiving statistical information sent by the access network device in a first working state, where the first working state is a working state of the access network device after turning on or off the M antenna elements;

determining, based on the statistical information in the first working state and statistical information in a second working state, whether to trigger the access network device to turn on or off P antenna elements in the N antenna elements, where the second working state is a working state of the access network device before turning on or off the M antenna elements, N>P≥1, and P is an integer; and if a determining result is "yes", sending second indication information to the access network device, where the second indication information is used to turn on or off the P antenna elements.

According to this embodiment, a maximum half-power angle of the first transceiver channel can be adaptively adjusted.

With reference to the first aspect, in a possible implementation of the first aspect, the statistical information includes one or both of a quantity of terminal devices accessing the access network device and a measurement report reported by each terminal device accessing the access network device, where the measurement report includes reference signal received power (reference signal receiving power, RSRP) of the terminal device.

The RSRP of the terminal device may be RSRP of an SSB or RSRP of a PDSCH. The SSB is a synchronization signal (synchronizing signal)/physical broadcast channel (physical broadcast channel, PBCH) block, that is, the SSB is an SS/PBCH block. In other words, in this application, the SSB and the SS/PBCH block are interchangeable.

With reference to the first aspect, in a possible implementation of the first aspect, the determining, based on the statistical information in the first working state and statistical information in a second working state, whether to trigger the access network device to turn on or off P antenna elements in the N antenna elements includes:

determining, based on the statistical information in the first working state and the statistical information in the second working state, a change of one or more of the following information in the first working state relative to the second working state:

a quantity of terminal devices accessing the access network device, a throughput of a cell served by the access network device, an average experienced rate of the terminal devices accessing the access network device, or RSRP of weakest V % terminal devices by RSRP of the terminal devices when the quantity of terminal devices accessing the network device remains unchanged, where V is a preset positive integer; and determining, based on the change, whether to trigger turning on or off the P antenna elements.

With reference to the first aspect, in a possible implementation of the first aspect, the determining that M antenna elements in N antenna elements connected to a first transceiver channel of an access network device need to be turned on or off includes: periodically determining that the M antenna elements in the N antenna elements need to be turned on or off; and the sending first indication information to the access network device includes: periodically sending the first indication information.

With reference to the first aspect, in a possible implementation of the first aspect, the determining that M antenna elements in N antenna elements connected to a first transceiver channel of an access network device need to be turned on or off includes:

determining, based on adjustment information, that the M antenna elements need to be turned on or off, where the adjustment information includes one or more of a station spacing, a station height, or a building height.

With reference to the first aspect, in a possible implementation of the first aspect, the determining, based on adjustment information, that the M antenna elements need to be turned on or off includes:

determining, based on the station spacing and a first mapping relationship, a total quantity, corresponding to the station spacing, of antenna elements that need to be in an on state in the first transceiver channel, where the first mapping relationship represents station spacings in different intervals and total quantities of antenna elements that need to be in an on state, and the total quantity of antenna elements that need to be in the on state is less than or equal to N; and determining, based on a quantity of antenna elements that have been turned on or off in the N antenna elements and the total quantity, corresponding to the station spacing, of antenna elements that need to be in the on state, that the M antenna elements need to be turned on or off.

With reference to the first aspect, in a possible implementation of the first aspect, the determining, based on adjustment information, that the M antenna elements need to be turned on or off includes:

determining, based on the station height and a second mapping relationship, a total quantity, corresponding to the station height, of antenna elements that need to be in an on state in the first transceiver channel, where the second mapping relationship represents station heights in different intervals and total quantities of antenna elements that need to be in an on state, and the total quantity of antenna elements that need to be in the on state is less than or equal to N; and determining, based on a quantity of antenna elements that have been turned on or off in the N antenna elements and the total quantity, corresponding to the station height, of antenna elements that need to be in the on state, that the M antenna elements need to be turned on or off.

In conclusion, according to the method for adjusting a half-power angle of an antenna in this embodiment of this application, a vertical half-power angle of the antenna can be flexibly adjusted for a specific scenario, thereby improving user experience in the specific scenario.

According to a second aspect, a method for adjusting a half-power angle of an antenna is provided, including: obtaining first indication information, where the first indication information is used to indicate to turn on or off M antenna elements in N antenna elements connected to a first transceiver channel, N>M≥1, and both N and M are integers; and turning on or off the M antenna elements based on the first indication information.

In the method of this embodiment of this application, a network management device can adjust a maximum half-power angle or a maximum beam gain of an individual transceiver channel by controlling an access network device to turn on or off antenna elements connected to the individual transceiver channel, to adjust a maximum half-power angle (a vertical half-power angle or a horizontal half-power angle) or a maximum beam gain of an antenna array. Therefore, increasing the maximum half-power angle of the antenna array and increasing the maximum beam gain of the antenna array can be flexibly switched without replacing the access network device or the entire antenna.

With reference to the second aspect, in a possible implementation of the second aspect, the method further includes:

sending statistical information in a first working state and statistical information in a second working state to the network management device, where the first working state is a working state after turning on or off the M antenna elements, and the second working state is a working state before turning on or off the M antenna elements.

With reference to the second aspect, in a possible implementation of the second aspect, the method further includes:

obtaining second indication information, where the second indication information is used to indicate to turn on or off P antenna elements in the N antenna elements, N>P≥1, and P is an integer; and turning on or off the P antenna elements based on the second indication information.

According to a third aspect, an apparatus is provided, and the apparatus includes a unit configured to perform any one of the first aspect or the possible implementations of the first aspect.

Optionally, the apparatus in the fifth aspect may be a network management device, or may be a component (for example, a chip or a circuit) that can be used for a network management device.

According to a fourth aspect, an embodiment of this application provides an apparatus, and the apparatus includes a unit configured to perform any one of the second aspect or the possible implementations of the second aspect.

Optionally, the apparatus in the fourth aspect may be an access network device, or may be a component (for example, a chip or a circuit) that can be used for an access network device.

According to a fifth aspect, a communications apparatus is provided, including a processor and a memory, where the memory is configured to store a computer program, and the processor is configured to: invoke the computer program from the memory and run the computer program, so that the apparatus performs the method according to any one of the first and second aspects or the possible implementations of the first and second aspects.

Optionally, there are one or more processors and one or more memories.

Optionally, the memory may be integrated with the processor, or the memory and the processor may be provided separately.

Optionally, the communications apparatus further includes a transceiver or a transceiver circuit, configured to implement the functions of receiving and sending information.

According to a sixth aspect, this application provides a computer-readable storage medium, where the computer-readable storage medium stores a computer program, and when the computer program is executed, the method according to any one of the first and second aspects or the possible implementations of the first and second aspects is implemented.

According to a seventh aspect, this application provides a computer program product containing a computer program. When the computer program is run, the method according to any one of the first and second aspects or the possible implementations of the first and second aspects is implemented According to an eighth aspect, this application provides a chip system, where the chip system includes an input/output interface and at least one processor, and the at least one processor is configured to invoke an instruction in a memory, to perform the operations of the method according to any one of the first and second aspects or the possible implementations of the first and second aspects.

Optionally, the chip system may further include at least one memory and a bus, and the at least one memory is configured to store the instruction executed by the processor.

Optionally, the input/output interface is implemented in a form of an interface circuit.

DETAILED DESCRIPTION OF EMBODIMENTS

Figure 1:
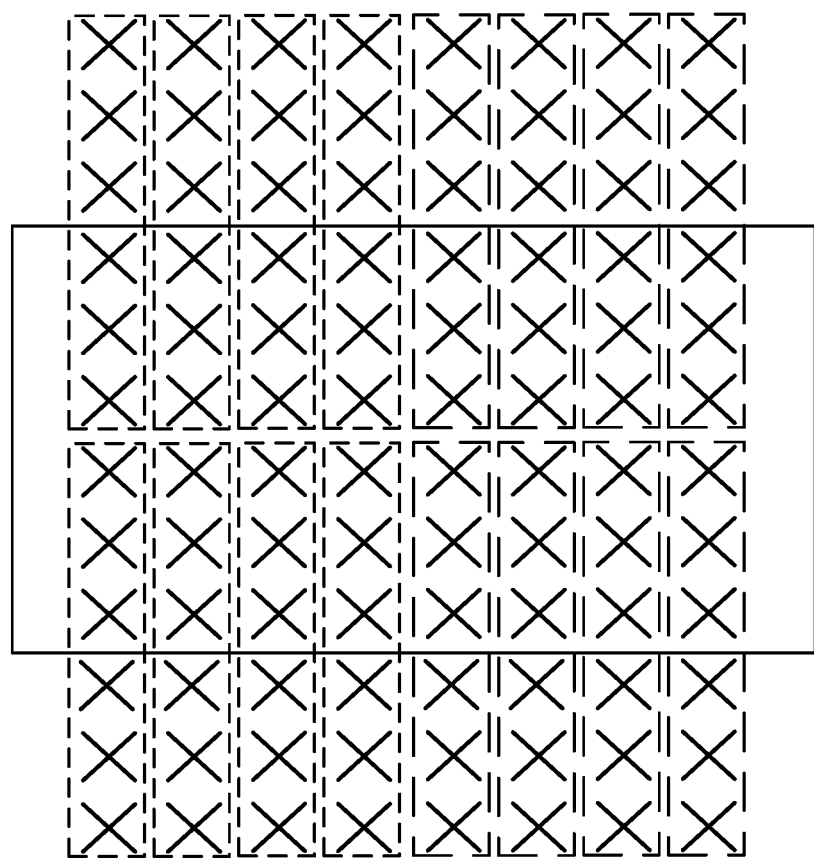
FIG. 1 is a schematic diagram of an antenna array of an access network device.

The following describes the technical solutions of this application with reference to the accompanying drawings.

The technical solutions of embodiments of this application may be used in various communications systems, such as: a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communications system, a 5th generation (5th generation, 5G) system, or a new radio (new radio, NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), or the like. This is not limited in the embodiments of this application.

An access network device in the embodiments of this application may be a device configured to communicate with a terminal device. The network device may be a base transceiver station (base transceiver station, BTS) in a global system for mobile communications (global system for mobile communications, GSM) system or code division multiple access (code division multiple access, CDMA), or a NodeB (NodeB, NB) in a wideband code division multiple access (wideband code division multiple access, WCDMA) system, or an evolved NodeB (evolved NodeB, eNB or eNodeB) in an LTE system, or a wireless controller in a cloud radio access network (cloud radio access network, CRAN) scenario; or the network device may be a relay station, an access point, a vehicle-mounted device, a wearable device, a network device in a future 5G network, a network device in a future evolved PLMN network, or the like. This is not limited in the embodiments of this application.

A network management device in the embodiments of this application may be referred to as an operation and maintenance network element, an operations support system (Operations Support System, OSS) network element, or a network management system (network management system, NMS) network element, but this is not limited in the embodiments of this application.

In the embodiments of this application, the access network device or the network management device includes a hardware layer, an operating system layer running over the hardware layer, and an application layer running over the operating system layer. The hardware layer includes hardware such as a central processing unit (central processing unit, CPU), a memory management unit (memory management unit, MMU), and an internal memory (also referred to as a main memory). The operating system may be any one or more computer operating systems that implement service processing through processes (process), for example, a Linux operating system, a Unix operating system, an Android operating system, an iOS operating system, or a Windows operating system. The application layer includes applications such as a browser, an address book, word processing software, and instant messaging software. Moreover, the embodiments of this application do not specifically limit a specific structure of an execution body of a method provided in the embodiments of this application, provided that the execution body can run a program that record code of the method provided in the embodiments of this application, to perform communication according to the method provided in the embodiments of this application. For example, the execution body of the method provided in the embodiments of this application may be the access network device or the network management device, or a functional module that can invoke and execute a program in the access network device or the network management device.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable medium" may include but is not limited to a radio channel and various other media that can store, contain, and/or carry an instruction and/or data.

Figure 2:
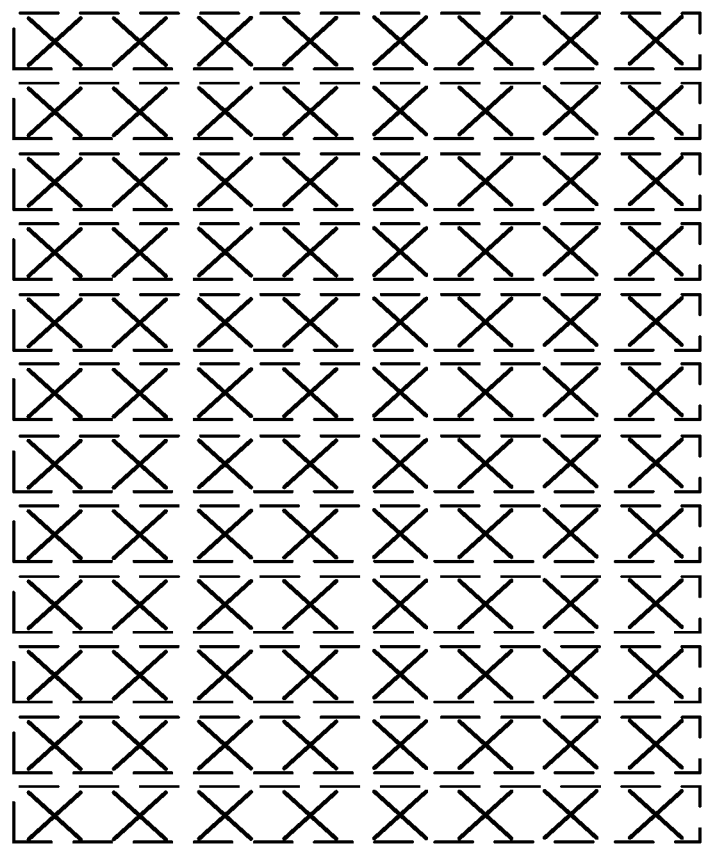
FIG. 2 is a schematic diagram of another antenna array of an access network device.

To enable persons skilled in the art to better understand this application, the method provided in this application is first described briefly with reference to FIG. 1 and FIG. 2.

FIG. 1 is a schematic diagram of an antenna array of an access network device. As shown in FIG. 1, the antenna array includes 12 rows by 8 columns of cross antenna elements. The 12 rows by 8 columns of cross antenna elements correspond to 32 transceiver channels. One transceiver channel is connected to six adjacent antenna elements in a same polarization direction in each dashed box. In other words, one transceiver channel corresponds to six adjacent antenna elements in the same polarization direction in each dashed box, and 12 antenna elements in the same polarization direction in a same column correspond to two transceiver channels. It should be noted that sometimes the "transceiver channel" is also referred to as a front or a transceiver unit (transceiver unit, TXRU). The antenna element is sometimes referred to as an antenna oscillator.

FIG. 2 is a schematic diagram of another antenna array of an access network device. As shown in FIG. 2, the antenna array also includes 12 rows by 8 columns of cross antenna elements. A difference from the antenna array shown in FIG. 1 lies in that the 12 rows by 8 columns of cross antenna elements correspond to 24 transceiver channels. Eight adjacent antenna elements in a same polarization direction in each row constitute one transceiver channel.

A beam can be directed to different directions in space or different beams can be formed by adjusting phases of the 32 transceiver channels corresponding to the antenna array shown in FIG. 1 or the 24 transceiver channels corresponding to the antenna array shown in FIG. 2 for beamforming (beamforming). A beam is generally defined as selectivity to different directions in space. A range of directions to which the beam can be directed is usually defined by a half-power angle. In a power pattern, in a plane containing a maximum radiation direction of a main lobe, an included angle between two points at which power flux density drops to half of the power flux density in the maximum radiation direction (or 3 dB less than a maximum value) is referred to as a half-power angle. The half-power angle includes a vertical half-power angle and a horizontal half-power angle. The vertical half-power angle defines a beam width in a vertical plane, and the horizontal half-power angle defines a beam width in a horizontal plane.

The range of directions to which the beam can be directed depends on hardware. When a quantity of antenna elements driven by an individual transceiver channel is constant, a half-power angle formed by the antenna elements driven by the individual transceiver channel (referred to as the half-power angle of the individual transceiver channel for short in this specification) is fixed. Moreover, as the quantity of elements driven by the individual transceiver channel increases, a maximum beam gain increases, and a maximum half-power angle decreases; as the quantity of elements driven by the individual transceiver channel decreases, a maximum beam gain decreases, and a maximum half-power angle increases. Generally, a range of a half-power angle of an antenna array does not exceed that of a half-power angle of an individual transceiver channel. In addition, for an antenna array with a fixed transceiver channel, if transmit power is constant, as a quantity of antenna elements driven by an individual transceiver channel increases, a maximum half-power angle of the antenna array decreases, and a maximum beam gain of the antenna array increases; conversely, as a quantity of antenna elements driven by an individual transceiver channel decreases, a maximum half-power angle of the antenna array increases, and a maximum beam gain of the antenna array decreases.

Therefore, in this application, the maximum half-power angle or the maximum beam gain of the individual transceiver channel can be adjusted by adjusting the quantity of antenna elements driven by the individual transceiver channel, to adjust the maximum half-power angle or the maximum beam gain of the antenna array. For example, it is possible to turn off a part of the six antenna elements connected to the individual transceiver channel shown in FIG. 1, that is, reduce a quantity of antenna elements driven by the individual transceiver channel, so that a maximum vertical half-power angle of the individual transceiver channel can be increased, but a maximum beam gain is reduced accordingly. For another example, it is possible to turn off a part of the eight antenna elements connected to the individual transceiver channel shown in FIG. 2, that is, reduce a quantity of antenna elements driven by the individual transceiver channel, so that a maximum horizontal half-power angle of the individual transceiver channel can be increased, but a maximum beam gain is reduced accordingly.

It should be noted that antenna elements connected to a transceiver channel described in this specification are antenna elements corresponding to the transceiver channel, and antenna elements driven by the transceiver channel are antenna elements that are in an on state (or a working state) in the antenna elements corresponding to the transceiver channel. In the prior art, antenna elements connected to a transceiver channel are equivalent to antenna elements driven by the transceiver channel. However, in this application, the antenna elements connected to the transceiver channel include the antenna elements driven by the transceiver channel and antenna elements that are not driven by the transceiver channel. The antenna elements that are not driven by the transceiver channel are antenna elements that are in an off state (or a non-working state) in the antenna elements corresponding to the transceiver channel.

Figure 3:
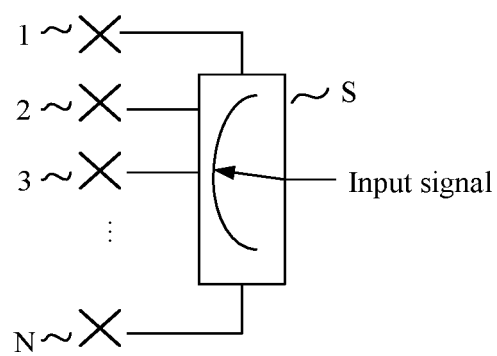
FIG. 3 is a schematic diagram of a structure for adjusting a quantity of antenna elements driven by an individual transceiver channel according to this application.

In a possible implementation, as shown in FIG. 3, a switching switch S may be connected to N (for example, 6 in FIG. 1 or 8 in FIG. 2) antenna elements corresponding to an individual transceiver channel, and the switching switch S is used to adjust a quantity of antenna elements driven by the individual transceiver channel, or in other words, the switching switch S is used to control to turn on or off one or more antenna elements. It should be understood that a signal input shown in FIG. 3 is a signal input to control the switching switch S, for example, first indication information, second indication information, or third indication information in the following description. When a total of W antenna elements in the individual transceiver channel are in an on state, a working state of the transceiver channel may also be referred to as a 1-drive-W mode, where W is an integer less than or equal to N. For example, when S points to an antenna element 3, only antenna elements 1, 2, and 3 work, that is, a 1-drive-3 mode.

It should be understood that other methods may also be used to implement the 1-drive-W mode, and the implementation shown in FIG. 3 is merely an example description and should not constitute any limitation to this application.

The following elaborates on the method for adjusting a half-power angle of an antenna provided in this application.

Figure 4:
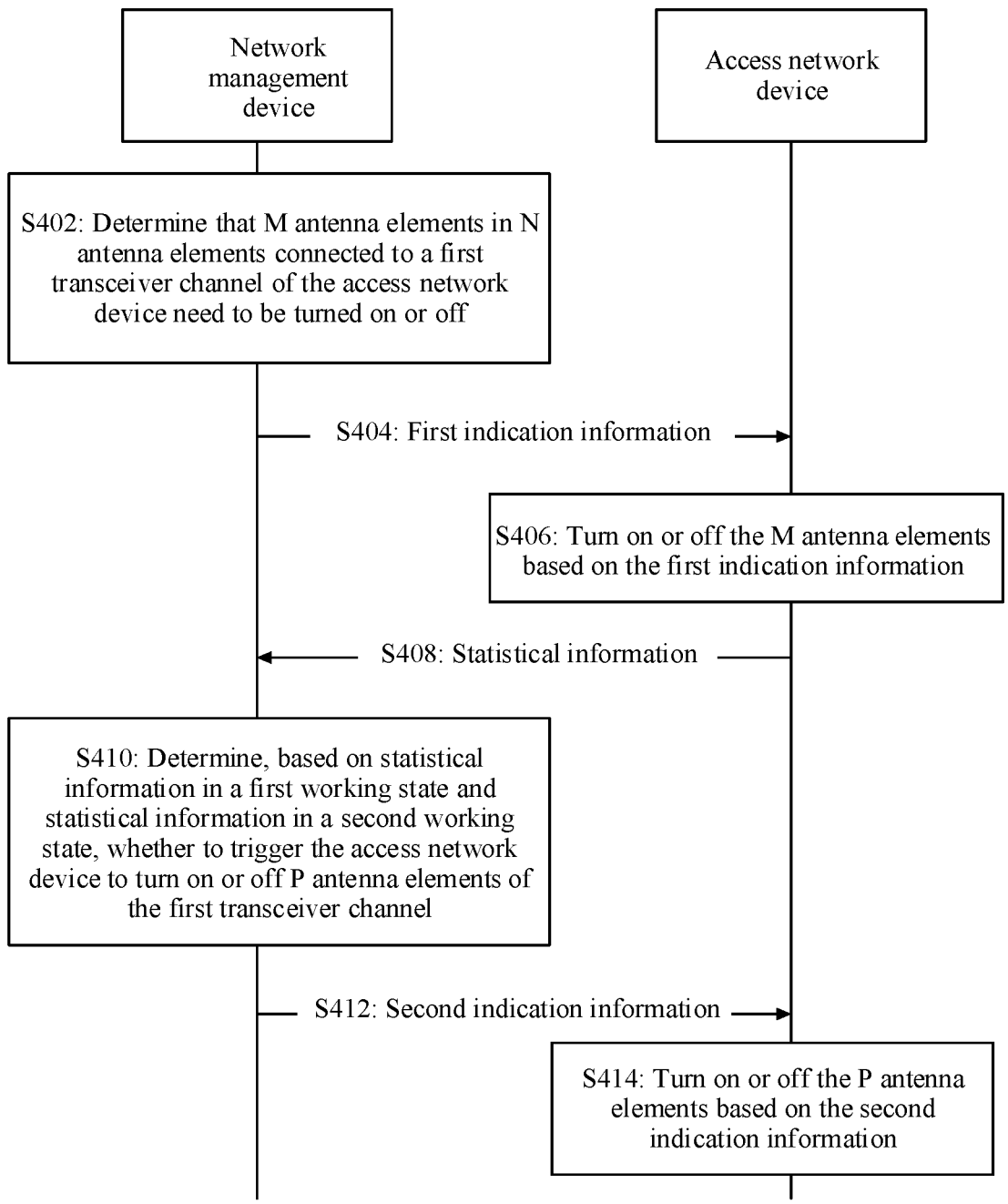
FIG. 4 shows a method for adjusting a half-power angle of an antenna according to this application.

FIG. 4 is a schematic flowchart of a method 400 for adjusting a half-power angle of an antenna according to this application. During description of the method shown in FIG. 4, some steps are described by using a network management device or an access network device as an execution body, but this is merely for the convenience of describing the method shown in FIG. 4. The method shown in FIG. 4 may be implemented by the network management device or the access network device, or may be implemented by a component (such as a chip, a circuit, or a software module) that can be used for the network management device or a component (such as a chip or a circuit) used in the access network device.

S402: The network management device determines that M antenna elements in N antenna elements connected to a first transceiver channel of the access network device need to be turned on or off, where N>M≥1, and both N and M are integers.

The first transceiver channel may be any transceiver channel of the access network device or a specific transceiver channel of the access network device. It should be understood that in this application, S402 may be interpreted as that, the network management device determines that M antenna elements in N antenna elements of any transceiver channel connected to the access network device need to be turned on or off. Alternatively, S402 may be interpreted as that, the network management device determines that M antenna elements in N antenna elements of a specific transceiver channel connected to the access network device need to be turned on or off. When this application is understood in the second interpretation manner, the network management device of this application may further refer to S402 to determine antenna elements that are of other transceiver channels and that need to be turned on or off. In this application, quantities of antenna elements that need to be turned on or off and that correspond to the transceiver channels may be the same or different. This is not limited in this application.

It should be understood that, in the method 400, the M antenna elements in the N antenna elements are antenna elements that need to be turned on in addition to an antenna element that has been turned on. Alternatively, the M antenna elements in the N antenna elements are antenna elements that need to be turned off in addition to an antenna element that has been turned off. It should be noted that, "the network management device determines that M antenna elements in N antenna elements connected to a first transceiver channel of the access network device need to be turned on or off" may mean that the network management device directly determines that the M antenna elements in the N antenna elements need to be additionally turned on or off, or may mean that the network management device indirectly determines that the M antenna elements in the N antenna elements need to be additionally turned on or off. For example, the network management device may directly determine a total quantity of antenna elements that need to be in the on state in the N antenna elements (including a quantity of antenna elements that have been in the on state and a quantity of antenna elements that need to be additionally turned on), and then indirectly determine, based on the quantity of antenna elements that have been in the on state in the N antenna elements, that the M antenna elements in the N antenna elements need to be additionally turned on or off. For another example, the network management device may directly determine that a second group of antenna elements of the first transceiver channel need to be additionally turned on, where the second group of antenna elements includes M antenna elements.

S404: The network management device sends first indication information to the access network device.

Correspondingly, the access network device receives the first indication information sent by the network management device. The first indication information is used to indicate the access network device to turn on or off the M antenna elements.

Optionally, the first indication information may include identifiers of the M antenna elements. Alternatively, when the M antenna elements of the first transceiver channel are grouped into one group and the group includes only the M antenna elements, the first indication information may carry a group identifier corresponding to the M antenna elements. In addition, which specific antenna element or antenna elements are the M antenna elements may also be determined by the access network device.

Further, the M antenna elements may be any M adjacent antenna elements in antenna elements that are of the first transceiver channel and that are not turned on or off currently. For example, it is assumed that, the N antenna elements connected to the first transceiver channel include antenna elements in a same polarization direction in one dashed box shown in FIG. 1, and all the antenna elements in the same polarization direction in the dashed box shown in FIG. 1 are currently in the on state. In this case, the M antenna elements may be three antenna elements in a same polarization direction in the upper half part or the lower half part of the dashed box. For another example, it is assumed that, the N antenna elements connected to the first transceiver channel include antenna elements in a same polarization direction in one dashed box shown in FIG. 2, and all the antenna elements in the same polarization direction in the dashed box shown in FIG. 2 are currently in the on state. In this case, the M antenna elements may be three antenna elements in a same polarization direction in the leftmost part or the middle part of the dashed box.

S406: The access network device turns on or off the M antenna elements based on the first indication information.

In the method of this embodiment of this application, the network management device can adjust a maximum half-power angle or a maximum beam gain of an individual transceiver channel by controlling the access network device to turn on or off antenna elements connected to the individual transceiver channel, to adjust a maximum half-power angle (a vertical half-power angle or a horizontal half-power angle) or a maximum beam gain of an antenna array. Therefore, increasing the maximum half-power angle of the antenna array and increasing the maximum beam gain of the antenna array can be flexibly switched without replacing the access network device or the entire antenna. Optionally, in an implementation of this application, indication information (for example, the first indication information, or the following second indication information or third indication information) sent by the network management device to the access network device may be a specific man-machine language (man-machine language, MML) command. After receiving the MML command through a radio resource control (radio resource control, RRC) layer, the access network device delivers corresponding indication information to an antenna management unit, and then the antenna management unit notifies the antenna to perform an operation of turning on or off the antenna elements. The antenna management unit may be a hardware or software module connected to a remote radio unit (remote radio unit, RRU). In addition, the antenna management unit may alternatively be integrated with the RRU. The RRU may be the transceiver channel of this application, but this is not limited in this embodiment of this application.

Optionally, in an embodiment of this application, in S402, the network management device may determine, based on adjustment information, that the M antenna elements need to be turned on or off.

The adjustment information may include, for example, one or more of a station spacing, a station height, or a building height. The station spacing may be an average distance between the access network device and an adjacent access network device. The station height may be a physical height of the access network device relative to the ground. The building height may be an average height of buildings that the access network device needs to cover, or a height of a tallest building in the buildings that the access network device needs to cover. For the specific definitions of the station spacing and the station height, refer to the prior art. Details are not described herein.

The following describes several possible implementations of S402 in detail with reference to specific content of the adjustment information.

Manner 1

The network management device determines, based on the station spacing and a first mapping relationship, a total quantity, corresponding to the station spacing, of antenna elements that need to be in the on state in the first transceiver channel, where the first mapping relationship represents station spacings in different intervals and total quantities of antenna elements that need to be in the on state, and the total quantity of antenna elements that need to be in the on state is less than or equal to N. Then, the network management device determines, based on a quantity of antenna elements that have been turned on or off in the N antenna elements and the total quantity, corresponding to the station spacing, of antenna elements that need to be in the on state, that the M antenna elements need to be turned on or off.

For example, N=6. In a possible situation, the network management device may store a correspondence between the first column and the second column shown in Table 1 (that is, an example of the first mapping relationship). In Table 1, a is a positive number and can be obtained based on historical data or experience.

TABLE 1

| Station spacing L | Total quantity of antenna elements of the first transceiver channel that need to be in the on state | Total quantity of antenna elements of the first transceiver channel that need to be in the off state |
|---|---|---|
| L > a | 6 | 0 |
| L ≤ a | 3 | 3 |

For example, it is preconfigured for the access network device that all six antenna elements connected to the first transceiver channel are in the on state. If the network management device finds that the station spacing L>a according to an engineering parameter table or engineering parameter database, it indicates that a large maximum beam gain and a small maximum vertical half-power angle are required. When all the six antenna elements are turned on, a maximum beam gain of the first transceiver channel is relatively small, and therefore states of the antenna elements connected to the first transceiver channel may not be adjusted. If the network management device finds that the station spacing L≤a according to the engineering parameter table, it indicates that a small maximum beam gain and a large maximum vertical half-power angle are required, and in this case, it can be determined that three antenna elements connected to the first transceiver channel need to be turned off.

It should be understood that during specific implementation, the access network device may alternatively store a correspondence between the first column and the third column shown in Table 1 (another example of the first mapping relationship).

In another possible situation, the network management device may store a correspondence between the first column and the second column shown in Table 2 (an example of the first mapping relationship). In Table 2, b is a positive number and can be obtained based on historical data or experience.

TABLE 2

| Station spacing L | Total quantity of antenna elements of the first transceiver channel that need to be in the on state | Total quantity of antenna elements of the first transceiver channel that need to be in the off state |
| --- | --- | --- |
| L > b1 | 6 | 0 |
| b2 < L ≤ b1 | 3 | 3 |
| L ≤ b2 | 1 | 5 |

Similarly, for example, it is preconfigured for the access network device that all six antenna elements connected to the first transceiver channel are in the on state. Then, it can be learned from Table 2 that if the network management device finds that the station spacing L>b1 according to an engineering parameter table, it indicates that working states of the antenna elements connected to the transceiver channel do not need to be adjusted; if the network management device finds that the station spacing L≤b2 according to the engineering parameter table, it can be determined that the access network device needs to turn off the five antenna elements connected to the first transceiver channel. Other cases are similar and are not repeated herein.

It should be understood that, similar to Table 1, during specific implementation, the access network device may alternatively store a correspondence between the first column and the third column shown in Table 2 (another example of the first mapping relationship).

Manner 2

The network management device may determine, based on the station height and a second mapping relationship, a total quantity, corresponding to the station height, of antenna elements that need to be in the on state in the first transceiver channel, where the second mapping relationship represents station heights in different intervals and total quantities of antenna elements that need to be in the on state, and the total quantity of antenna elements that need to be in the on state is less than or equal to N. Then, the network management device determines, based on a quantity of antenna elements that have been turned on or off in the N antenna elements and the total quantity, corresponding to the station height, of antenna elements that need to be in the on state, that the M antenna elements need to be turned on or off.

It should be understood that Manner 2 is similar to Manner 1. For specific implementation details of Manner 2, refer to the foregoing description of Manner 1. Details are not repeated herein.

Manner 3

The network management device may determine, based on the building height and a third mapping relationship, a total quantity, corresponding to the building height, of antenna elements that need to be in the on state in the first transceiver channel, where the third mapping relationship represents building heights in different intervals and total quantities of antenna elements that need to be in the on state, and the total quantity of antenna elements that need to be in the on state is less than or equal to N. Then, the network management device determines, based on a quantity of antenna elements that have been turned on or off in the N antenna elements and the total quantity, corresponding to the building height, of antenna elements that need to be in the on state, that the M antenna elements need to be turned on or off.

It should be understood that Manner 3 is similar to Manner 1 and Manner 2. For specific implementation details of Manner 3, refer to the foregoing description of Manner 1. Details are not repeated herein.

It should be understood that the three manners may also be used in combination. The network management device may prestore a correspondence between the station spacing, the station height, and a total quantity of the antenna elements that need to be in the on state in the first transceiver channel. Then, the network management device may determine, based on the station spacing and the station height, that the M antenna elements need to be turned on or off.

In conclusion, according to the method for adjusting a half-power angle of an antenna in this embodiment of this application, a vertical half-power angle of the antenna can be flexibly adjusted for a specific scenario, thereby improving user experience in the specific scenario.

Optionally, S402 and S404 may be performed periodically. For example, a timer may be set. After the timer expires, S402 may be performed, and accordingly, S404 may be performed. In this way, a maximum half-power angle of the first transceiver channel can be adjusted periodically to adapt to scenario requirements.

Optionally, in another implementation of this application, after S406, the method may further include:

S408: The access network device sends statistical information of the access network device in a first working state to the network management device.

Herein, the access network device may work in the first working state for a preset time period before sending the statistical information in the first working state. The preset time period may be one day. This is not limited in this embodiment of this application.

In this specification, for ease of understanding, a working state of the access network device after turning on or off the M antenna elements is denoted as the first working state; and a current working state of the access network device, that is, a working state before turning on or off the M antenna elements is denoted as a second working state.

It should be understood that before S406, the access network device may further send statistical information of the access network device in the second working state to the network management device.

S410: The network management device determines, based on the statistical information in the first working state and the statistical information in the second working state, whether to trigger the access network device to turn on or off P antenna elements in the N antenna elements, where N>P≥1, and P is an integer.

S412: If a determining result is "yes", the network management device sends second indication information to the access network device. Correspondingly, the access network device receives the second indication information sent by the network management device. The second indication information is used to indicate the access network device to turn on or off the P antenna elements.

S414: The access network device turns on or off the P antenna elements based on the second indication information.

Specifically, after adjusting to the first working state, the access network device may send the statistical information in the first working state to the network management device. Based on the statistical information in the first working state and the statistical information in the second working state of the access network device, the network management device may determine whether to further adjust the working state of the access network device (that is, whether to further turn on or off several antenna elements). If an adjustment is required, the network management device sends the second indication information to the access network device, to control the access network device to adjust the working state.

It should be understood that if the network management device determines, based on the statistical information in the first working state and the statistical information in the second working state of the access network device, that the working state of the access network device does not need to be adjusted, it indicates that scenario requirements are met when the access network device is in the second working state. In this case, the access network device may work in the second working state until the network management device indicates the access network device to adjust the working state.

P may be equal to M or not equal to M. This is not limited in this embodiment of this application. If P≠M, after the access network device turns on or off the P antenna elements based on the second indication information, the access network device may work in this working state (denoted as a third working state) until the network management device indicates the access network device to adjust the working state. In addition, after switching (or adjusting) from the first working state to a third working state, the access network device may send statistical information in the third working state to the network management device with reference to the operation described in S408. Then with reference to the operation described in S410, the network management device may determine, based on the statistical information in the first working state and the second working state of the access network device, whether to trigger the access network device to switch the working state; and when the working state needs to be switched, determine whether to control the access network device to switch back to the first working state or another working state.

To help persons skilled in the art to better understand this application, the following assumptions are made for illustration: (1) The second working state of the access network device is: all the six antenna elements connected to the first transceiver channel of the access network device are turned on; and (2) M=3.

In one example, P=3. Then, after S406, the first working state of the access network device is: three antenna elements connected to the first transceiver channel are turned on, and three antenna elements are turned off. After switching from the second working state to the first working state, the access network device may normally operate for a period of time (for example, one day), and then send statistical information to the network management device. If the network management device determines, based on the statistical information in the first working state and the statistical information in the second working state, that requirements such as a vertical coverage area can be met when the access network device is in the second working state, the access network device continues to work in the second working state. Otherwise, third indication information is sent to the access network device, to indicate the access network device to adjust the working state to the first working state; and the access network device adjusts to the first working state based on the third indication information.

In another example, P=2. Then, if the access network device determines, based on the statistical information in the first working state and the statistical information in the second working state, that requirements such as a vertical coverage area can be met when the access network device is in the second working state, the access network device continues to work in the second working state. Otherwise, third indication information is sent to the first access network device, to indicate the access network device to turn off two more antenna elements connected to the first transceiver channel. In this case, the working state of the access network device is the third working state: a 1-drive-1 mode. The access network device may normally operate in the third working state for a period of time (for example, one day), and then send statistical information to the access network device. If the access network device determines, based on the statistical information in the third working state and the statistical information in the first working state, that current scenario requirements such as a vertical coverage area can be met when the access network device is in the third working state, the access network device continues to work in the third working state. Otherwise, indication information (for example, denoted as fourth indication information) is sent to the first access network device, to indicate the access network device to adjust the working state to the first working state or the second working state; and the access network device is adjusted to the first working state or the second working state based on the fourth indication information.

For example, the statistical information may include a quantity of terminal devices accessing the access network device and/or measurement reports reported by the terminal devices accessing the access network device.

Optionally, in S410, the network management device may determine, based on the statistical information in the first working state and the statistical information in the second working state, a change of one or more of the following information in the first working state relative to the second working state: a quantity of terminal devices accessing the access network device, an average experienced rate of the terminal devices accessing the access network device, a throughput of a cell served by the access network device, or RSRP of weakest V % terminal devices by RSRP of the terminal devices when the quantity of terminal devices accessing the network device remains unchanged, where V is a preset positive integer. Then the network management device determines, based on the change, whether to trigger turning on or off the P antenna elements. The RSRP of the terminal device may be RSRP of a synchronization signal/physical broadcast channel PBCH block SSB or RSRP of a physical downlink shared channel (physical downlink shared channel, PDSCH).

The following assumptions are made to illustrate the foregoing manner: (1) The second working state of the access network device is a 1-drive-6 mode; and (2) M=3. Then, relative to the second working state:

A. If the quantity of terminal devices accessing the access network device increases or a throughput rate of the cell increases in the first working state, the network management device no longer switches the working state of the access network device.

B. If the quantity of terminal devices accessing the access network device decreases or a throughput rate of the cell decreases in the first working state, the network management device indicates the access network device to switch to the second working state.

C. If the quantity of terminal devices accessing the access network device remains unchanged, but RSRP of weakest 5% terminal devices in the first working state is increased relative to RSRP of the weakest 5% terminal devices in the second working state, the working state does not need to be adjusted again.

D. If the quantity of terminal devices accessing the access network device remains unchanged, but RSRP of weakest 5% terminal devices in the first working state is decreased relative to RSRP of the weakest 5% terminal devices in the second working state, the network management device indicates the access network device to switch to the second working state.

It should be noted that the method of this application may also be implemented in the access network device, without interacting with the network management device. For example, the functions of the network management device used to implement this application may be integrated into the access network device. For another example, the foregoing operation in S402 may be implemented by an RRU or an active antenna unit (active antenna unit, AAU). In this case, correspondingly, S404 may be: the first transceiver channel obtains the first indication information.

The method for adjusting a half-power angle of an antenna provided in the embodiments of this application is described above in detail with reference to FIG. 1 to FIG. 4. An apparatus for adjusting a half-power angle of an antenna provided in the embodiments of this application is described below in detail with reference to FIG. 5 to FIG. 7.

Figure 5:
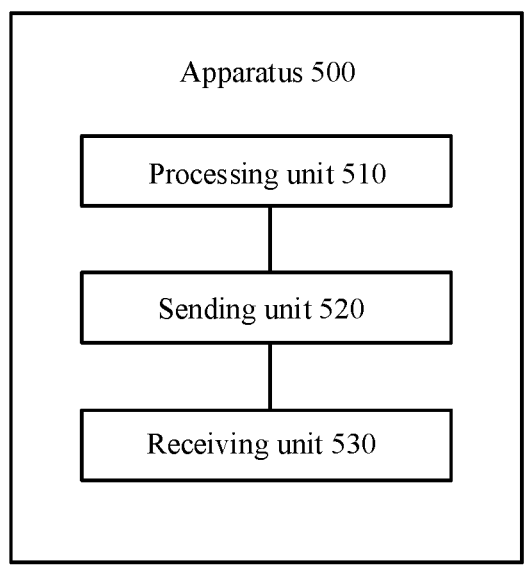
FIG. 5 is a schematic block diagram of an apparatus according to an embodiment of this application.

According to the foregoing method, FIG. 5 is a schematic block diagram of an apparatus 500 according to an embodiment of this application. As shown in FIG. 5, the apparatus 500 may be a network management device, or may be a chip or a circuit, for example, a chip or a circuit that can be disposed in the network management device. The network management device may correspond to the network management device in the foregoing method. Specifically, the apparatus 500 may include a processing unit 510 and a sending unit 520. Optionally, the apparatus 500 may further include a receiving unit 530.

The processing unit 510 is configured to determine that M antenna elements in N antenna elements connected to a first transceiver channel of an access network device need to be turned on or off, where N>M≥1, and both N and M are integers.

The sending unit 520 is configured to send first indication information to the access network device, where the first indication information is used to indicate to turn on or off the M antenna elements.

Optionally, the receiving unit 530 is configured to receive statistical information sent by the access network device in a first working state, where the first working state is a working state of the access network device after turning on or off the M antenna elements.

The processing unit 510 is configured to determine, based on the statistical information in the first working state and statistical information in a second working state, whether to trigger the access network device to turn on or off P antenna elements in the N antenna elements, where the second working state is a working state of the access network device before turning on or off the M antenna elements, N>P≥1, and P is an integer.

The sending unit 520 is configured to: when a determining result of the processing unit 510 is "yes", send second indication information to the access network device, where the second indication information is used to turn on or off the P antenna elements.

Optionally, the statistical information includes one or both of a quantity of terminal devices accessing the access network device and a measurement report reported by each terminal device accessing the access network device, where the measurement report includes reference signal received power RSRP of the terminal device.

Optionally, the processing unit 520 is specifically configured to: determine, based on the statistical information in the first working state and the statistical information in the second working state, a change of one or more of the following information in the first working state relative to the second working state:

a quantity of terminal devices accessing the access network device, an average experienced rate of the terminal devices accessing the access network device, a throughput of a cell served by the access network device, or SSB RSRP of weakest V % terminal devices by RSRP of the terminal devices when the quantity of terminal devices accessing the network device remains unchanged, where V is a preset positive integer; and determine, based on the change, whether to trigger turning on or off the P antenna elements.

Optionally, the processing unit 510 is specifically configured to periodically determine that the M antenna elements in the N antenna elements need to be turned on or off; and the sending, by the apparatus 500, first indication information to the access network device includes:

the sending unit 520 is specifically configured to periodically send the first indication information.

Optionally, the processing unit 510 is specifically configured to determine, based on adjustment information, that the M antenna elements need to be turned on or off, where the adjustment information includes one or more of a station spacing, a station height, or a building height.

Optionally, the processing unit 510 is specifically configured to determine, based on the station spacing and a first mapping relationship, a total quantity, corresponding to the station spacing, of antenna elements that need to be in an on state in the first transceiver channel, where the first mapping relationship represents station spacings in different intervals and total quantities of antenna elements that need to be in an on state, and the total quantity of antenna elements that need to be in the on state is less than or equal to N; and determine, based on a quantity of antenna elements that have been turned on or off in the N antenna elements and the total quantity, corresponding to the station spacing, of antenna elements that need to be in the on state, that the M antenna elements need to be turned on or off.

Optionally, the processing unit 510 is specifically configured to determine, based on the station height and a second mapping relationship, a total quantity, corresponding to the station height, of antenna elements that need to be in an on state in the first transceiver channel, where the second mapping relationship represents station heights in different intervals and total quantities of antenna elements that need to be in an on state, and the total quantity of antenna elements that need to be in the on state is less than or equal to N; and determine, based on a quantity of antenna elements that have been turned on or off in the N antenna elements and the total quantity, corresponding to the station height, of antenna elements that need to be in the on state, that the M antenna elements need to be turned on or off.

It should be understood that the apparatus 500 may correspond to the network management device in the method 400 according to the embodiments of this application, and the apparatus 500 may include units for performing the method performed by the network management device in the method 400 shown in FIG. 4. In addition, the units of the apparatus 500 and other operations and/or functions described above are used to implement the corresponding procedures of the method 400 shown in FIG. 4. Specifically, the processing unit 510 is configured to perform steps S402 and S410 in the method 400, the sending unit 520 is configured to perform steps S404 and S412 in the method 400, and the receiving unit is configured to perform step S408 in the method 400. Specific processes in which the units perform the corresponding steps above have been described in detail in the method 400. For brevity, details are not repeated herein.

In a possible manner, the sending unit 520 may be implemented by a transmitter and the receiving unit 530 may be implemented by a receiver, or the sending unit 520 and the receiving unit 530 may be implemented by a transceiver.

In a possible embodiment, an apparatus for adjusting a half-power angle of an antenna is further provided. The apparatus may be a network management device or a component (such as a chip or a circuit) that can be used for a network management device. The apparatus may include a processor. Optionally, the apparatus may further include a transceiver and a memory. The processor may be configured to implement the corresponding functions and operations of the processing unit 510, the sending unit 520, and the receiving unit. Optionally, the memory may be further configured to store an executable instruction or application program code that is controlled and executed by the processor to implement the method 400 provided in FIG. 4 of this application; and/or the memory may also be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of this application.

Figure 6:
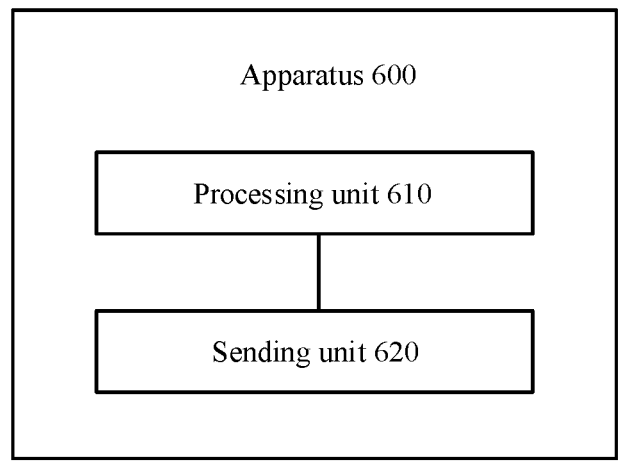
FIG. 6 is a schematic block diagram of an apparatus according to an embodiment of this application.

According to the foregoing method, FIG. 6 is a schematic block diagram of an apparatus 600 according to an embodiment of this application. As shown in FIG. 6, the apparatus 600 may be the apparatus 600, or may be a chip or a circuit, for example, a chip or a circuit that can be disposed in the apparatus 600. The apparatus 600 may correspond to the network management device in the foregoing method. Specifically, the apparatus 600 may include a processing unit 610. Optionally, the apparatus 600 may further include a sending unit 620.

The processing unit 610 is configured to: obtain first indication information, where the first indication information is used to indicate to turn on or off M antenna elements in N antenna elements connected to a first transceiver channel, N>M≥1, and both N and M are integers; and turn on or off the M antenna elements based on the first indication information.

Optionally, the sending unit 620 is configured to send statistical information in a first working state and statistical information in a second working state to the network management device, where the first working state is a working state after turning on or off the M antenna elements, and the second working state is a working state before turning on or off the M antenna elements.

Optionally, the processing unit 610 is configured to: obtain second indication information, where the second indication information is used to indicate to turn on or off P antenna elements in the N antenna elements, N>P≥1, and P is an integer; and turn on or off the P antenna elements based on the second indication information.

It should be understood that the apparatus 600 may correspond to the access network device in the method 400 according to the embodiments of this application, and the apparatus 600 may include units for performing the method performed by the access network device in the method 400 shown in FIG. 4. In addition, the units of the apparatus 600 and other operations and/or functions described above are used to implement the corresponding procedures of the method 400 shown in FIG. 4. Specifically, the processing unit 610 is configured to perform steps S404, S406, S412, and S414 in the method 400, and the sending unit 620 is configured to perform step S412 in the method 400. Specific processes in which the units perform the corresponding steps above have been described in detail in the method 400. For brevity, details are not repeated herein.

In a possible manner, the processing unit 610 may be implemented by a processor, and the sending unit 620 may be implemented by a transmitter. Alternatively, in some implementations, the processing unit 610 may be implemented by a receiver.

In a possible embodiment, an apparatus for adjusting a half-power angle of an antenna is further provided. The apparatus may be an access network device or a component (such as a chip or a circuit) that can be used for an access network device. The apparatus may include a processor and a transceiver. Optionally, the apparatus may further include a memory. The processor may be configured to implement the corresponding functions and operations of the processing unit 610, and the transceiver may be configured to implement the corresponding functions and operations of the sending unit 620. Optionally, the memory may be further configured to store an executable instruction or application program code that is controlled and executed by the processor to implement the method 400 provided in FIG. 4 of this application; and/or the memory may also be configured to temporarily store some data, instruction information, and the like. The memory may exist independently of the processor. In this case, the memory may be connected to the processor through a communication line. In another possible design, the memory may alternatively be integrated with the processor. This is not limited in this embodiment of this application.

Figure 7:
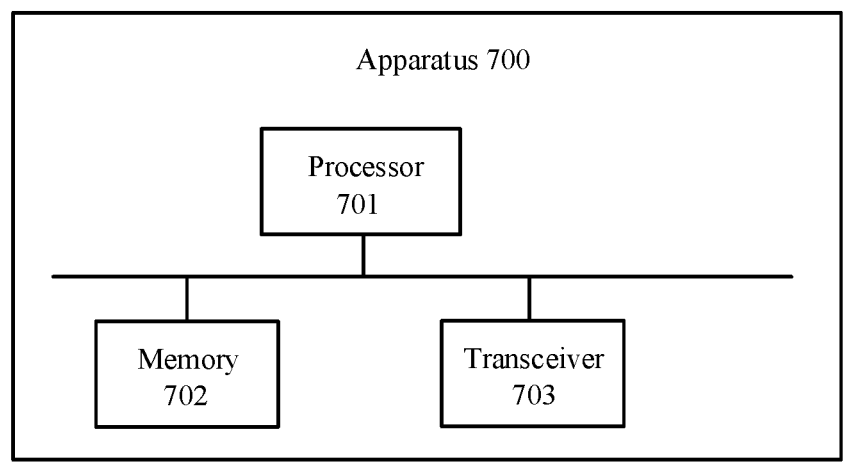
FIG. 7 is a structural block diagram of a network device according to an embodiment of this application.

FIG. 7 is a structural block diagram of a network device according to an embodiment of the present invention. The apparatus 700 shown in FIG. 7 includes a processor 701, a memory 702, and a transceiver 703.

The processor 701, the memory 702, and the transceiver 703 communicate with each other through an internal connection path, to transfer control and/or data signals.

The method disclosed in the foregoing embodiments of the present invention may be used in the processor 701 or implemented by the processor 701. The processor 701 may be an integrated circuit chip and has a signal processing capability. In an implementation process, steps in the foregoing methods may be implemented by using a hardware integrated logic circuit in the processor 701, or by using instructions in a form of software. The processor 701 may be a general purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, or a discrete hardware component. The processor 701 may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory 702, and the processor 701 reads instructions in the memory 702 and completes the steps in the foregoing methods in combination with hardware of the processor 701.

Optionally, in some embodiments, the memory 702 may store instructions for performing the method performed by the access network device or the network management device in the method shown in FIG. 4. The processor 701 may execute the instructions stored in the memory 702 in combination with other hardware (such as the transceiver 703) to complete the steps of the access network device or the network management device in the method shown in FIG. 4. For specific working processes and beneficial effects, refer to the description in the embodiment shown in FIG. 4.

It should be noted that, the first working state and the second working state used in FIG. 4 to FIG. 7 are only for identification purposes and do not limit the solutions. For example, the working state before turning on or off the M antenna elements may be denoted as the first working state; and the working state after turning on or off the M antenna elements may be denoted as the second working state.

An embodiment of this application further provides a method for determining to turn on or off one or more antenna elements. It is possible to determine, by adjusting cell coverage, whether to turn on or off one or more antenna elements, and then indicate an access network device to turn on or off the one or more antenna elements.

Description is provided below by using an example in which a working state of the access network device before turning on or off the M antenna elements is the first working state, and a working state of the access network device after turning on or off the M antenna elements is the second working state. S901 to S904 may be considered as an example of S402.

S901: The access network device adjusts cell coverage.

Optionally, the adjusting cell coverage includes adjusting broadcast channel coverage or adjusting full channel coverage.

Optionally, the adjusting broadcast channel coverage includes decreasing broadcast channel power or increasing a broadcast beam width.

Optionally, the adjusting full channel coverage includes adjusting an electrical tilt of a first transceiver channel.

Optionally, decreasing the broadcast channel power, increasing the broadcast beam width, and adjusting the electrical tilt of the first transceiver channel can be implemented by using various solutions in the prior art. This is not limited in this embodiment of this application.

As an example, decreasing the broadcast channel power may be implemented by a physical layer adjusting transmit power on a time-frequency resource of a broadcast channel. For example, a media access control (MAC, media access control) layer may send a power control factor to the physical layer, and the physical layer adjusts the transmit power on the time-frequency resource of the broadcast channel by using the power control factor. When the power control factor is 1, it represents full-power transmission, and when the power control factor is 0.5, it represents half-power transmission.

As an example, increasing the broadcast beam width may be implemented by forming relatively large included angles between a plurality of beams formed by a plurality of transceiver channels, and then forming a relatively wide broadcast beam.

The relatively large included angles between the beams formed by the plurality of transceiver channels may be relatively large included angles between beams formed by a plurality of transceiver channels in a same polarization direction or relatively large included angles between beams formed by a plurality of transceiver channels in different polarization directions.

As an example, the included angles between the plurality of beams formed by the plurality of transceiver channels may be adjusted by adjusting phases of phase shifters of the plurality of transceiver channels.

Figure 10:
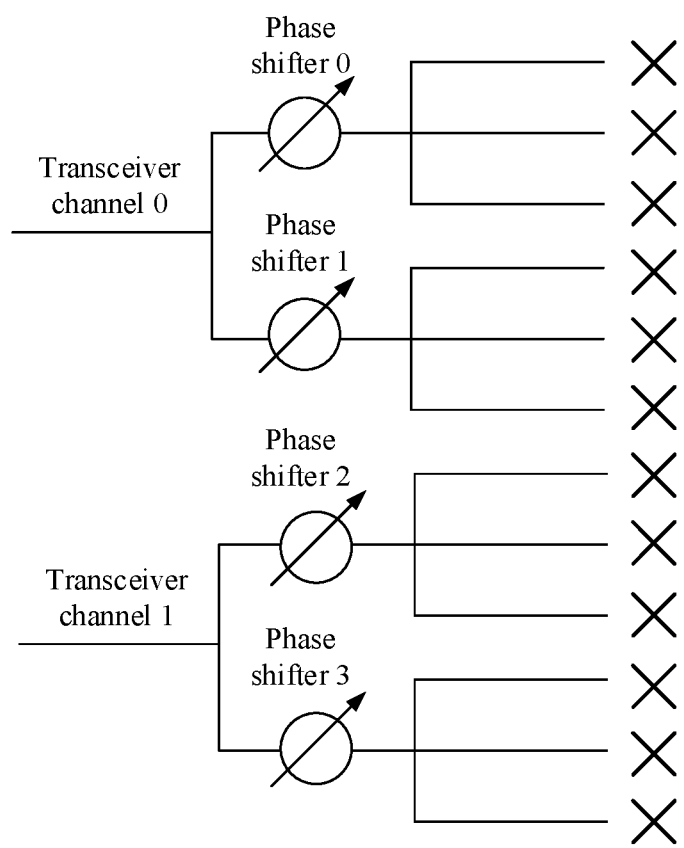
FIG. 10 is a schematic structural diagram of an antenna according to an embodiment of this application.

As shown in FIG. 10, a transceiver channel 0 is connected to three antenna elements through a phase shifter 0, and to other three antenna elements through a phase shifter 1; and a transceiver channel 1 is connected to other three antenna elements through a phase shifter 2, and to other three antenna elements through a phase shifter 3. Polarization directions of the elements connected to the transceiver channel 0 and the transceiver channel 1 may be the same or different. For example, the elements connected to both the transceiver channel 0 and the transceiver channel 1 are in the +45 degree polarization direction or the −45 degree polarization direction; or the elements connected to the transceiver channel 0 are in the +45 degree polarization direction, and the elements connected to the transceiver channel 1 are in the −45 degree polarization direction. Therefore, polarization directions of a beam formed by the transceiver channel 0 and a beam formed by the transceiver channel 1 may be the same or different.

The direction of the beam formed by the transceiver channel 0 may be adjusted by adjusting the phase shifter 0 and the phase shifter 1. For example, the beam formed by the transceiver channel 0 may be directed to above a perpendicular normal by adjusting the phase shifter 0 and the phase shifter 1. The direction of the beam formed by the transceiver channel 1 may be adjusted by adjusting the phase shifter 2 and the phase shifter 3. For example, the beam formed by the transceiver channel 1 may be directed to below the perpendicular normal by adjusting the phase shifter 2 and the phase shifter 3. The perpendicular normal may be understood as a direction perpendicular to an antenna array. The perpendicular normal may be denoted as 0 degrees. A negative degree is above the perpendicular normal, for example, −6 degrees is above the perpendicular normal, and a positive degree is above the perpendicular normal, for example, +6 degrees is above the perpendicular normal.

As an example, adjusting the full channel coverage includes adjusting coverage of a broadcast channel beam and/or a data channel beam, so that the broadcast channel beam and/or data channel beam can cover an originally uncovered area. For example, adjusting the full channel coverage includes adjusting an electrical tilt of the first transceiver channel. An electrical tilt may be referred to as an electrical tilt, and may be understood as tilting down a signal transmitted by an antenna.

The first transceiver channel may be the first transceiver channel in S402, and the first transceiver channel may be one transceiver channel or a plurality of transceiver channels. When the first transceiver channel is a plurality of transceiver channels, electrical tilts adjusted for the transceiver channels may be the same, or electrical tilts adjusted for at least two transceiver channels may be different. Adjusting an electrical tilt of a transceiver channel may be expressed as adjusting an electrical tilt of an antenna. This is not limited in this embodiment of this application.

With reference to FIG. 10, values of the phase shifters 0, 1, 2 and 3 may be adjusted. For example, assuming that a transceiver channel is connected to X phase shifters, values of the X phase shifters may be adjusted by using the following formula:

$$a(\theta) = \left[1, e^{-j2\pi\frac{\sin\theta d}{\lambda}}, \ldots, e^{-j2\pi\frac{(X-1)\sin\theta d}{\lambda}}\right]$$

where θ specifically refers to degrees or radians of an electrical tilt, d represents a distance between elements, and λ represents a wavelength. A vector composed of existing values of the X phase shifters may be multiplied by the foregoing formula to obtain a new vector. For example, a value of the first phase shifter remains unchanged, a value of the second phase shifter is multiplied by 1, and a value of the $X^{th}$ phase shifter is multiplied by $$e^{-j2\pi\frac{\sin\theta d}{\lambda}}.$$

Adjusting the electrical tilt of the transceiver channel can change a combined broadcast channel beam or a data channel beam, to cover the originally uncovered area.

Optionally, the access network device may determine to adjust the cell coverage; or the access network device may receive indication information from the network management network element, where the indication information indicates the access network device to adjust the cell coverage.

Optionally, the access network device may adjust the cell coverage when a detection period arrives; or the network management network element may notify the access network device to adjust the cell coverage when a detection period arrives. For example, the detection period is 5 days.

Optionally, the access network device may adjust the cell coverage when an event is triggered; or the network management network element may notify the access network device to adjust the cell coverage when an event is triggered. For example, a trigger condition may be that statistical information of the access network device satisfies a specific condition, for example, a quantity of users in a cell is less than or equal to a threshold.

Adjusting the cell coverage may simulate front switching, which is convenient for comparing performance of the cell before and after adjusting the cell coverage to determine whether to initiate the front switching.

S902: A network management device receives statistical information in a third working state from the access network device.

Optionally, the third working state is a working state before turning on or off the M antenna elements and before adjusting the cell coverage.

S903: The network management device receives statistical information in a fourth working state from the access network device.

Optionally, the fourth working state is a working state before turning on or off the M antenna elements and after adjusting the cell coverage.

As an example, in S902 and S903, the third working state is the 1-drive-6 mode, and the broadcast channel power is not decreased; the fourth working state is the 1-drive-6 mode, and the broadcast channel power is decreased by 6 dB.

As another example, in S902 and S903, the third working state is the 1-drive-6 mode, and the broadcast beam width is 12 degrees; the fourth working state is the 1-drive-6 mode, and the broadcast beam width is 25 degrees.

As another example, in S902 and S903, the third working state is the 1-drive-6 mode, and the electrical tilt of the first transceiver channel is 0 degrees; the fourth working state is the 1-drive-6 mode, and the electrical tilt of the first transceiver channel is 3 degrees.

For adjusting of the cell coverage in S903 and S902, refer to the related content in S901. Details are not repeated herein.

S904: Determine, based on the statistical information in the third working state and the statistical information in the fourth working state, whether to send the first indication information to the access network device, where the first indication information is used to indicate the access network device to turn on or off the M antenna elements.

The statistical information in the third working state may be compared with the statistical information in the fourth working state to determine whether the performance of the cell has changed after the cell coverage is adjusted, and then determine whether to turn on or off the M antenna elements.

For example, the statistical information may include one or more of the following: a quantity of terminal devices accessing the access network device, an average experienced rate of the terminal devices accessing the access network device, a throughput of a cell served by the access network device, and measurement reports reported by the terminal devices accessing the access network device.

Optionally, the quantity of terminal devices accessing the access network device may be obtained by the access network device through statistics collection.

Optionally, the throughput of the cell served by the access network device may be obtained by the access network device through statistics collection; or the terminals may calculate and report throughputs of the terminals, so that the throughput of the cell served by the access network device is obtained by the access network device through accumulation.

Optionally, the terminal devices report experienced rates of the terminal devices, and the access network device adds up and averages the experienced rates of the plurality of terminal devices, to obtain the average experienced rate of the terminal devices accessing the access network device.

Optionally, the measurement reports may be reported by the terminal devices to the access network device.

Optionally, as an example, before and after the adjusting broadcast channel coverage such as decreasing broadcast channel power or increasing a broadcast beam width, the following comparisons may be made:

A. Comparing the fourth working state with the third working state. If a value by which the quantity of terminal devices accessing the access network device decreases does not exceed a threshold (for example, if the quantity of terminal devices accessing the access network device increases, remains unchanged, or decreases by a value that does not exceed the threshold), it is determined to send the first indication information to the access network device; if the value by which the quantity of terminal devices accessing the access network device decreases exceeds the threshold, the first indication information is not sent to the access network device.

For example, the third working state is the 1-drive-6 mode, and the broadcast channel power is not decreased; the fourth working state is the 1-drive-6 mode, and the broadcast channel power is decreased by 6 dB. Compared with the third working state, in the fourth working state, the quantity of terminal devices accessing the access network device is the same and does not decrease, and it is determined to switch to a 1-drive-3 front, and send the first indication information to the access network device, where the first indication information indicates the access network device to turn off three antenna elements.

For example, the third working state is the 1-drive-6 mode, and the broadcast beam width is 12 degrees; the fourth working state is the 1-drive-6 mode, and the broadcast beam width is 25 degrees. Compared with the third working state, in the fourth working state, the quantity of terminal devices accessing the access network device is the same and does not decrease, and it is determined to switch to a 1-drive-3 front, and send the first indication information to the access network device, where the first indication information indicates the access network device to turn off three antenna elements.

B. Comparing the fourth working state with the third working state. If a decrease in the average experienced rate of the terminal devices accessing the access network device does not exceed a threshold (for example, if the average experienced rate of the terminal devices accessing the access network device increases, remains unchanged, or decreases by a value that does not exceed the threshold), it is determined to send the first indication information to the access network device; if the value by which the average experienced rate of the terminal devices accessing the access network device decreases exceeds the threshold, the first indication information is not sent to the access network device.

C. Comparing the fourth working state with the third working state. If a value by which the throughput of the cell served by the access network device decreases does not exceed a threshold (for example, if the throughput of the cell served by the access network device increases, remains unchanged, or decreases by a value that does not exceed the threshold), it is determined to send the first indication information to the access network device; if the value by which the throughput of the cell served by the access network device decreases exceeds the threshold, the first indication information is not sent to the access network device.

D. Based on the measurement reports reported by the terminal devices accessing the access network device, if a decrease in RSRP of weakest X % terminal devices in the fourth working state relative to RSRP of the weakest X % terminal devices in the third working state does not exceed a threshold (for example, if the RSRP of the weakest X % terminal devices in the fourth working state relative to the RSRP of the weakest X % terminal devices in the third working state increases, remains unchanged, or decreases by a value that does not exceed the threshold), it is determined to send the first indication information to the access network device; if the RSRP of the weakest X % terminal devices in the fourth working state relative to the RSRP of the weakest X % terminal devices in the third working state decreases by a value that exceeds the threshold, the first indication information is not sent to the access network device.

Herein, RSRP of the terminal devices accessing the access network device may be sorted in descending order. The RSRP of the weakest X % terminal devices may be understood as an average value of the RSRP of lowest X % terminal devices, or RSRP of an $(X\%)^{th}$ terminal device starting from a terminal device with lowest RSRP.

E. Based on the measurement reports reported by the terminal devices accessing the access network device, if a decrease in average RSRP of the terminal devices accessing the access network device in the fourth working state relative to average RSRP of the terminal devices accessing the access network device in the third working state does not exceed a threshold (for example, if the average RSRP of the terminal devices accessing the access network device in the fourth working state relative to the average RSRP of the terminal devices accessing the access network device in the third working state increases, remains unchanged, or decreases by a value that does not exceed the threshold), it is determined to send the first indication information to the access network device; if the average RSRP of the terminal devices accessing the access network device in the fourth working state relative to the average RSRP of the terminal devices accessing the access network device in the third working state decreases by a value that exceeds the threshold, the first indication information is not sent to the access network device.

Herein, the average RSRP of the terminal devices accessing the access network device may be understood as a value obtained by adding up and then averaging RSRP values of the terminal devices accessing the access network device.

Optionally, for the RSRP of the terminal devices in C and D in S410, refer to the related content of the RSRP of the terminal devices in D in the first example of S904. In S410, in addition to the RSRP of the weakest X % terminal devices, an average RSRP value of the terminal devices may also be determined. For details, refer to D in the first example in S904.

For example, in A, B, C, D, and E, when it is determined to send the first indication information, the first indication information may indicate to turn off three antenna elements of a radio frequency channel.

It should be noted that whether to perform front switching may be determined based on one item of A, B, C, D, and E, for example, based on A, B, C, D, or E. Alternatively, whether to perform front switching may be determined based on a plurality of items of A, B, C, D, and E. For example, A, B, C, D, and E may be combined in various forms, for example, including but not limited to: A+B, A+C, A+D, A+E, A+B+C, A+B+D, A+B+E, B+C, B+D, B+E, B+C+D, C+D, C+E, and A+B+C+D+E.

When whether to perform front switching is determined based on a plurality of items of A, B, C, D, and E, front switching may be performed when all the plurality of items are satisfied, or when at least one of the plurality of items is satisfied.

After the broadcast channel power is decreased or the broadcast beam width is increased, if the performance of the cell is not significantly reduced, it indicates that reducing a quantity of elements does not significantly affect the performance of the cell, and front switching may be performed. For example, the front switching may be performed if the quantity of terminal devices accessing the access network device, the average experienced rate of the terminal devices accessing the access network device, the throughput of the cell served by the access network device, or the RSRP of the terminal devices does not decrease significantly. If the performance of the cell is significantly reduced, it indicates that if the elements are reduced in this case, the quantity of connected terminal devices may also decrease, and the front switching may not be performed.

Optionally, as a second example, before and after the adjusting full channel coverage such as adjusting an electrical tilt of the first transceiver channel, the following comparisons may be made:

A. Comparing the fourth working state with the third working state. If a value by which the quantity of terminal devices accessing the access network device increases exceeds a threshold, it is determined to send the first indication information to the access network device; if the value by which the quantity of terminal devices accessing the access network device increases does not exceed the threshold, the first indication information is not sent to the access network device.

B. Comparing the fourth working state with the third working state. If a value by which the average experienced rate of the terminal devices accessing the access network device increases exceeds a threshold, it is determined to send the first indication information to the access network device; if the value by which the average experienced rate of the terminal devices accessing the access network device increases does not exceed the threshold, the first indication information is not sent to the access network device.

C. Comparing the fourth working state with the third working state. If a value by which the throughput of the cell served by the access network device increases exceeds a threshold, it is determined to send the first indication information to the access network device; if the value by which the throughput of the cell served by the access network device increases does not exceed the threshold, the first indication information is not sent to the access network device.

It should be noted that whether to perform front switching may be determined based on one item of A, B, and C, for example, based on A, B, or C. Alternatively, whether to perform front switching may be determined based on a plurality of items of A, B, and C. For example, A, B, and C may be combined in various forms, for example, including but not limited to: A+B, A+C, B+C, and A+B+C.

When whether to perform front switching is determined based on a plurality of items of A, B, and C, front switching may be performed when all the plurality of items are satisfied, or when at least one of the plurality of items is satisfied.

Figure 9:
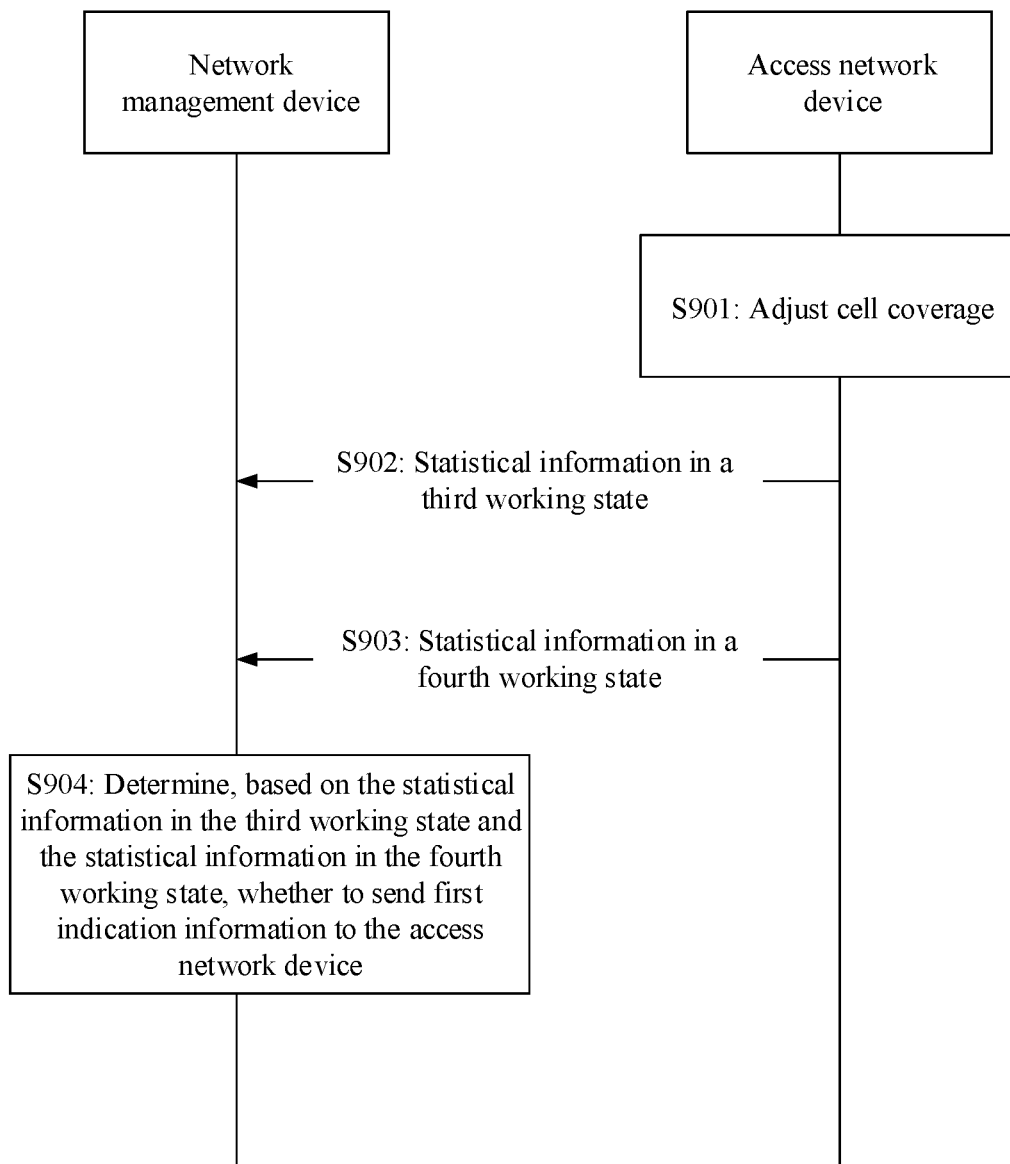
FIG. 9 shows another method for adjusting a half-power angle of an antenna according to an embodiment of this application.

The content in FIG. 9 and the content in FIG. 4 may be mutually combined or cited.

For example, the method of FIG. 9 may be performed before S402. The access network device may select a default front configuration such as the 1-drive-6 mode during initial work. The network management device uses this method to determine whether to switch to another mode, such as the 1-drive-3 mode. Alternatively, the network management device uses this method to determine that the M antenna elements need to be turned on or off, for example, turn off three antenna elements, and then send indication information to the access network device.

For another example, the method of FIG. 9 may be performed after S406 and may be used as an alternative to S408 to S410. The network management device may determine, during initial work, to turn on or off the M antenna elements based on adjustment information, for example, one or more of a station spacing, a station height, or a building height. After the access network device turns on or off the M antenna elements, the network management device may use this method to determine whether to switch to another mode, or the network management device may use this method to determine whether to turn on or off the P antenna elements, and then send indication information to the access network device.

It should be noted that for the following three methods for adjusting a quantity of antenna elements in this embodiment of this application, one of the methods may be selected for use, or the methods may be used in combination. For example, two or three of the methods may be used in combination, such as (1)+(2), (1)+(3), (2)+(3), (1)+(2)+(3), and so on.

(1) It is determined to turn on or off the M antenna elements based on the adjustment information.
(2) It is determined to turn on or off the M antenna elements based on statistical information in a working state before an adjustment and statistical information in a working state after the adjustment.
(3) It is determined to turn on or off the M antenna elements based on statistical information before adjusting the cell coverage and statistical information after adjusting the cell coverage.

The method (3) may be used to select an initial front.

It should be noted that the method performed by the network management network element in this embodiment of this application may be performed by the access network device. For example, S402 and S410 may be performed by the access network device. Persons skilled in the art can understand that the access network device does not need to send or receive indication information. For example, the access network device may turn on or off the M antenna elements after determining that the M antenna elements in the N antenna elements connected to the first transceiver channel need to be turned on or off. For example, the access network device may turn on or off the P antenna elements of the first transceiver channel after determining to turn on or off the P antenna elements of the first transceiver channel based on the statistical information in the first working state and the statistical information in the second working state. For example, the access network device determines, based on the statistical information in the third working state and the statistical information in the fourth working state, whether to turn on or off the M antenna elements, and then turns on or off the M antenna elements of the first transceiver channel.

Optionally, in this embodiment of this application, when one or more antenna elements of the transceiver channel are turned on or off, power of the transceiver channel may remain unchanged. For example, when the M antenna elements are turned on or off in S406 and S414, the power of the transceiver channel may remain unchanged.

The foregoing method provided in this embodiment of this application may be implemented by the apparatuses provided in FIG. 5 to FIG. 7. For details, refer to related content in FIG. 5 to FIG. 7. Details are not repeated herein.

Figure 8:
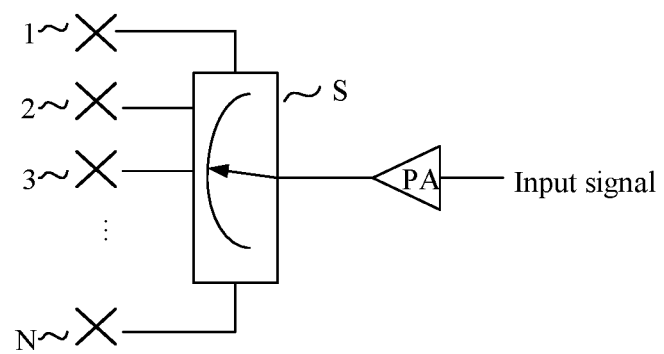
FIG. 8 is a schematic diagram of another structure for adjusting a quantity of antenna elements driven by an individual transceiver channel according to an embodiment of this application.

FIG. 8 is a schematic diagram of another structure for adjusting a quantity of antenna elements driven by an individual transceiver channel. As shown in FIG. 8, an input signal may be transmitted to one or more antenna elements through a power amplifier (power amplifier, PA). Power of the PA may remain unchanged before and after a switching switch S controls a transceiver channel to turn on or off one or more antenna elements.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip can perform the method performed on the side of the access network device or the side of the network management device in the foregoing embodiment.

As another form of this embodiment, a computer-readable storage medium is provided, and the computer-readable storage medium stores an instruction. When the instruction is executed, the method on the side of the access network device or the side of the network management device in the foregoing method embodiment is performed.

As another form of this embodiment, a computer program product including an instruction is provided. When the instruction is executed, the method on the side of the access network device or the side of the network management device in the foregoing method embodiment is performed.

In this patent application, various objects such as various messages/information/devices/network elements/systems/apparatuses/actions/operations/procedures/concepts have been assigned names, but these specific names do not limit the related objects. The assigned names may change with factors such as scenarios, context, or usage habits. The technical meanings of the related objects should be determined mainly from the functions and technical effects embodied/executed in the technical solutions.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. An apparatus, comprising at least one processor and a memory coupled to the at least one processor and storing programming instructions for execution of the programming instructions by the at least one processor causes the apparatus to perform operations comprising:
determining, based on adjustment information, that M antenna elements in N antenna elements connected to a first transceiver channel of an access network device need to be turned on or off, wherein $N > M \geq 1$, and both N and M are integers, wherein the adjustment information comprises one or more of a station spacing, a station height, or a building height; and sending first indication information to the access network device, wherein the first indication information is used to indicate to turn on or off the M antenna elements.

2. The apparatus according to claim 1, wherein execution of the programming instructions by the at least one processor further causes the apparatus to perform operations comprising:
receiving, from the access network device, statistical information of the access network device in a first working state, wherein the first working state is a working state of the access network device before turning on or off the M antenna elements;
receiving, from the access network device, statistical information of the access network device in a second working state, wherein the second working state is a working state of the access network device after turning on or off the M antenna elements; and
determining, based on the statistical information in the first working state and the statistical information in the second working state, whether to send second indication information to the access network device, wherein the second indication information is used to indicate to turn on or off P antenna elements, wherein N>P≥1, and P is an integer.

3. The apparatus according to claim 2, wherein execution of the programming instructions by the at least one processor that cause the apparatus to determine based on the statistical information in the first working state and the statistical information in the second working state, whether to send the second indication information to the access network device include instructions that cause the apparatus to
determine a change of one or more of the following statistical information in the second working state relative to the first working state:
a quantity of terminal devices accessing the access network device, a throughput of a cell served by the access network device, an average experienced rate of the terminal devices accessing the access network device, or synchronization signal and physical broadcast channel (PBCH) block (SSB) reference signal received power (RSRP) of weakest V % terminal devices by RSRP of the terminal devices when the quantity of terminal devices accessing the access network device remains unchanged, wherein V is a preset positive integer; and
determine based on the change, whether to send the second indication information to the access network device.

4. The apparatus according to claim 1, wherein execution of the programming instructions by the at least one processor further cause the apparatus to perform operations comprising:
receiving, from the access network device, statistical information of the access network device in a third working state, wherein the third working state is a working state before turning on or off the M antenna elements and before adjusting cell coverage;
receiving, from the access network device, statistical information of the access network device in a fourth working state, wherein the fourth working state is a working state before turning on or off the M antenna elements and after adjusting cell coverage; and
determining, based on the statistical information in the third working state and the statistical information in the fourth working state, to send the first indication information to the access network device.

5. The apparatus according to claim 4, wherein the adjusting cell coverage comprises adjusting broadcast channel coverage or adjusting full channel coverage.

6. The apparatus according to claim 5, wherein the adjusting broadcast channel coverage comprises decreasing broadcast channel power or increasing a broadcast beam width.

7. The apparatus according to claim 5, wherein the adjusting full channel coverage comprises adjusting an electrical tilt of the first transceiver channel.

8. The apparatus according to claim 5, wherein the statistical information comprises one or more of a quantity of terminal devices accessing the access network device, a throughput of a cell served by the access network device, an average experienced rate of the terminal devices accessing the access network device, and a measurement report received from each terminal device accessing the access network device, wherein the measurement report comprises reference signal received power (RSRP) of the terminal device.

9. The apparatus according to claim 7, wherein the statistical information comprises one or more of a quantity of terminal devices accessing the access network device, a throughput of a cell served by the access network device, and an average experienced rate of the terminal devices accessing the access network device.

10. The apparatus according to claim 1, wherein the programming instructions that cause the apparatus to determine based on adjustment information, that the M antenna elements need to be turned on or off include instructions that cause the apparatus to:
determine based on the station spacing and a first mapping relationship, a total quantity, corresponding to the station spacing, of antenna elements that need to be in an on state in the first transceiver channel, wherein the first mapping relationship represents station spacings in different intervals and total quantities of antenna elements that need to be in an on state, and the total quantity of antenna elements that need to be in the on state is less than or equal to N; and
determine based on a quantity of antenna elements that have been turned on or off in the N antenna elements and the total quantity, corresponding to the station spacing, of antenna elements that need to be in the on state, that the M antenna elements need to be turned on or off.

11. The apparatus according to claim 10, wherein the programming instructions that cause the apparatus to determine based on adjustment information, that the M antenna elements need to be turned on or off include instructions that cause the apparatus to:
determine based on the station height and a second mapping relationship, a total quantity, corresponding to the station height, of antenna elements that need to be in an on state in the first transceiver channel, wherein the second mapping relationship represents station heights in different intervals and total quantities of antenna elements that need to be in an on state, and the total quantity of antenna elements that need to be in the on state is less than or equal to N; and
determine based on a quantity of antenna elements that have been turned on or off in the N antenna elements and the total quantity, corresponding to the station height, of antenna elements that need to be in the on state, that the M antenna elements need to be turned on or off.

12. A method for adjusting a half-power angle of an antenna, comprising:

determining, based on adjustment information, that M antenna elements in N antenna elements connected to a first transceiver channel of an access network device need to be turned on or off, wherein N>M≥1, and both N and M are integers, wherein the adjustment information comprises one or more of a station spacing, a station height, or a building height; and sending first indication information to the access network device, wherein the first indication information is used to indicate to turn on or off the M antenna elements.

13. The method according to claim 12, wherein the method further comprises:

receiving, from the access network device, statistical information of the access network device in a third working state, wherein the third working state is a working state before turning on or off the M antenna elements and before adjusting cell coverage;

receiving, from the access network device, statistical information of the access network device in a fourth working state, wherein the fourth working state is a working state before turning on or off the M antenna elements and after adjusting cell coverage; and determining, based on the statistical information in the third working state and the statistical information in the fourth working state, to send the first indication information to the access network device.

14. The method according to claim 13, wherein the adjusting cell coverage comprises adjusting broadcast channel coverage or adjusting full channel coverage.

15. The method according to claim 14, wherein the adjusting broadcast channel coverage comprises decreasing broadcast channel power or increasing a broadcast beam width.

16. The method according to claim 14, wherein the adjusting full channel coverage comprises adjusting an electrical tilt of the first transceiver channel.

\* \* \* \* \*